United States Patent [19]

Fortuna et al.

[11] 4,105,640

[45] Aug. 8, 1978

[54] POLYCONDENSATION THERMOPLASTIC ELASTOMERS COMPOSED BY ALTERNATINGLY ARRANGED COPOLYESTERAMIDES

[75] Inventors: Giorgio Della Fortuna, Milan; Luciano Zotteri, San Donato Milanese (Milan), both of Italy

[73] Assignee: ANIC, S.p.A., Mendrisio Stazione, Switzerland

[21] Appl. No.: 809,129

[22] Filed: Jun. 22, 1977

[30] Foreign Application Priority Data

Jul. 21, 1976 [IT] Italy .............................. 25548 A/76
May 18, 1977 [IT] Italy .............................. 23701 A/77

[51] Int. Cl.$^2$ ............................................. C08G 63/68
[52] U.S. Cl. .................................................... 528/292
[58] Field of Search ...................................... 260/75 N

[56] References Cited

U.S. PATENT DOCUMENTS

| | | | |
|---|---|---|---|
| 3,272,774 | 9/1966 | Moyer .......................... | 260/75 N X |
| 3,828,010 | 8/1974 | Davis et al. ...................... | 260/75 N |
| 4,002,600 | 1/1977 | Habermeier ...................... | 260/75 N |

OTHER PUBLICATIONS

Goodman et al., Polyesters, vol. I, Saturated Polymers (London ILIFFE Books, Ltd.), 1965, pp. 131–134 & 139.

*Primary Examiner*—Lucille M. Phynes
*Attorney, Agent, or Firm*—Morgan, Finnegan, Pine, Foley & Lee

[57] ABSTRACT

Novel thermoplastic elastomers are disclosed, which are based on copolyesteramides and are composed by a statistically distributed array of soft and hard molecular chains, bonded to each other by ester bonds. These thermoplastic elastomers have shown an improved resistance to heat and hydrocarbonaceous fluids such as fuels, lubricants and the like.

6 Claims, No Drawings

POLYCONDENSATION THERMOPLASTIC ELASTOMERS COMPOSED BY ALTERNATINGLY ARRANGED COPOLYESTERAMIDES

This invention relates to polycondensation thermoplastic elastomers composed by alternatingly arranged copolyesteramides.

A number of copolymers are known, which are obtained by polycondensation of a diester with a low-molecular-weight glycol and a polyglycol, generally a polyoxyalkylene glycol having a molecular weight ranging from 1,000 and 3,000.

These materials have quite a special morphology for their being formed by hard crystalline zones (hard segments) immersed in amorphous regional areas having an elastomeric nature (soft segments). Such "hard-soft" structures cause these polymers to be classified among the elastoplastic materials, i.e. materials which can be converted into finished goods having elastic properties which are improved over those of the conventional plastics materials, by exploiting quick and cheap conversion processes: these latter are typical for this class of polymerizates, such as: injection-molding, extrusion, compression-molding, rotary molding, blowing and so forth.

The subject-matter of the present invention is a thermoplastic elastomer based on copolyesteramide, composed by a statistically distributed array of molecular soft and hard sequences which are mutually bound by ester bonds.

The two types of macromolecular sequences can be depicted by the following formulas:

a) 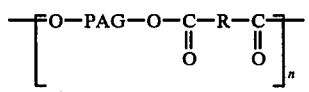

b) 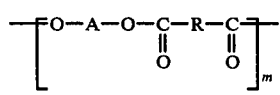

wherein PAG is a bivalent radical deriving from the polyoxyalkylene-glycols having a molecular weight ranging from 400 to 3,500, A is a bivalent radical of alpha-omega-dihydroxyalkane with a molecular weight of less than 250, R is bivalent radical of a diesteramide having the general formula:

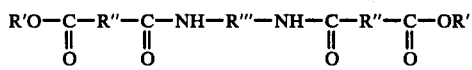

wherein R' is selected from alkyl hydrocarbon radicals containing from 1 to 8 carbon atoms, aryl radicals having from 6 to 10 carbon atoms, or alicyclic radicals of from 4 to 10 carbon atoms; R" and R'''' are selcted from among bivalent hydrocarbon radicals having from 2 to 30 carbon atoms, such as:

a. an alkyl radical of the type:

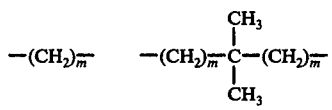

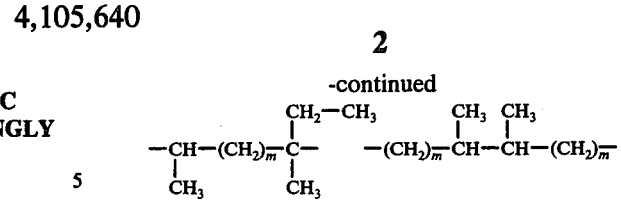

wherein m is an integer comprised between 2 and 20;

b. an aryl radical such as para- or meta-phenylene, para- of meta-xylene;

c. an alicyclic radical such as 1,4-cyclohexyl, 1,3-cyclohexyl, 2-methyl-1,4-cyclohexyl, 2-methyl-1,3-cyclohexyl, dicycloarylmethane and others.

The above-mentioned diesterdiamides are synthesized according to the following general reaction pattern:

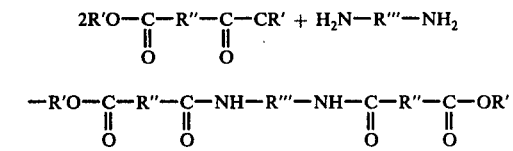

as claimed in the Italian Patent Specifications 908 843 and 908 844 to the same Assignee hereof.

The use of diesterdiamides in the thermoplastic elastomers enables to obtain the formation of highly crystalline hard phases having a high melting point and a high crystallization speed. In addition, the melting point is poorly sensitive to the variations of the composition due to the improved phase separation and the high variation of the melting enthalpy which are characteristic of the polymers having crystalline phases with hydrogen with hydrogen bonds.

It is important that the units of the type b), called hereinbefore the hard segments, are contained in the polymer in a percentage comprised between 2 and 80% on a weight basis. They are composed by repeating units with a molecular weight of about 500 and are obtained by reaction of the diesterdiamide with a low-molecular-weight diol (mol.wt.less than 250).

The units of the a) type are obtained by the reaction of the diesterdiamide with polyhydroxyalkylene glycols having a molecular weight of more than 250 and preferably ranging from 400 to 3,500. Representative examples of such polyoxyalkylene glycols are:
poly-(1,2-propyleneoxy) glycol
poly-(1,3-propyleneoxy) glycol
poly-(tetramethyleneoxy) glycol
dihydroxyl-terminated copolymers, either statistical or of the block type of ethylene oxide and of 1,2-propylene, and copolyglycols of tetrahydrofuran and methyltetrahydrofuran.

Among the low-molecular-weight diols which, by reacting with the diesterdiamide, form the short macromolecular segments, are comprised the alicyclic, the linear and the aromatic glycols.

The preferred diols derive from bivalent hydrocarbon radicals having from 2 to 14 carbon atoms, such as ethylene, propylene, tetramethylene, hexamethylene, dodecamethylene, cyclohexyl, 2,2-dimethyltrimethylene, cyclohexanedimethylene.

1,6-hexanediol is especially suitable to the ends of the present invention.

Products having good technological characteristics are likewise obtained by simultaneously reacting with the polyoxyalkylene glycol two different types of diesterdiamides with two low-molecular weight glycols.

The copolyesteramide which is the most suitable to the ends of the present invention is the one which is obtained from N,N'-dicarbomethoxybenzoylhexamethylenediamine (6NT), 1,6-hexanediol and polytetramethyleneetherglycol having a molecular weight ranging from 600 and 2,000.

The polymers as described in the present invention are properly prepared according to the known transesterification and polycondensation process. Such a process is carried out by heating the mixture formed by the diesterdiamide and the polyoxyalkylene glycol with an excess quantity of 1,6-hexanediol in the presence of a catalyst at a temperature of from 220° C to 240° C: in this stage, the distillation of the methanol which has been formed during the transesterification is experienced. The operation is carried out under an inert atmosphere, with a vigorous stirring and is continued until such time as the theoretical amount of methanol has been collected. Such a period of time is a function of the temperature, the kind of catalyst used and the excess of glycol which is adopted.

This stage of the process is conducive to a low-molecular-weight prepolymer, which is converted into a polymer having the appropriate molecular weight by distillation at high temperatures (250° C – 270° C), with stirring and with a residual pressure lower than 1 Torr, of the excess low-molecular-weight glycol and of the glycol which has been formed during polycondensation, the distillation being accompanied by a rearrangement of the copolyester units, such rearrangement originating a statistical distribution of such units in the macromolecular field.

The duration of the polycondensation as a function of the working conditions which are adopted, is generally comprised between 1 and 4 hours.

While a great variety of catalyst types can be adopted, particularly suitable have proved to be titanium alcoholates, and quite specially titanium tetraisopropylate, which is added, for metering convenience, diluted in isopropanol.

Both the stages of the process, transesterification and polycondensation, are generally carried out without solvents: the materials are in the molten state.

While the copolymers, which are the subject-matter of the present invention, are generally stable, it is, however, advisable to incorporate therein, especially for a few compositions, stabilizers against the action of heat and ultraviolet radiations.

The mechanical properties of such copolyesteramides can be modified by adding several inorganic additives such as carbon black, silica-gel, alumina, glass fibers, so as to improve the elasticity modulus of the material.

The copolyesteramides the subject of the present invention, inasmuch as they contain in their mole preshaped amidic groups which originate hydrogen bonds, have mechanical properties which are improved over those of the conventional similar thermoelastomeric materials which have an exclusively polyesteric matrix, since the presence of such a type of bond between the chains actually encourages the separation between the crystalline and the amorphous phase, the existence of which, as has been outlined above, is the special characteristic of the thermoelastomers;

In the ensuing examples, the percentages are indicated on a weight basis, the intrinsic viscosity (I.V.) is expressed in dl/g and has been measured in a solution in phenol-tetrachloroethane, 50:50 by weight at 25° C, the concentration being 0.5%.

The melting point has been determined by differential thermal analysis by assuming the temperature which corresponded to the minimum of the endothermic curve as obtained with a heating rate of 10° C per minute.

For the determination of the technological properties of the polymer samples reported in the several examples, the following methods have been adopted:

| | |
|---|---|
| Yielding load | DIN-53504/53 |
| Tensile strength | |
| Permanent set at 100% elongation | |
| Clash-Berg twist modulus | ASTM D 418/DIN III |
| Permanent compression set, % | ASTM D 395/Meth.B |
| Izod Impact test | ASTM D 256/56 |
| Shore Hardness | ASTM D 2240 |
| Swelling in oil, ASTM Type 3 | ASTM D 471 |
| Swelling in fuel B | |
| Swelling in fuel C | |

The following changes have been introduced to the above reported standards:
(1) When determining the compression set, the recovery of the sample, after the deformation, is carried out at the test temperature and not at room temperature.
(2) The swelling tests are carried out on samples measuring 1 by 4 by 12 millimeters.
(3) The tensile tests have been carried out at a stretching speed of 50 millimeters per minute.

The samples have been prepared by compression molding at temperatures which were from 20° C to 30° C above the melting point of the polymer concerned: the latter had previously been dried at 100° C during 5 hours in a vacuo.

EXAMPLES 1 – 3

A 500-ml, three necked flask equipped with stirrer, inert gas intake tube and extension tube for the distillation of methanol and hexanediol, is charged with 100 grams of 6NT monomer, 56.8 grams of 1,6-hexanediol, 0.05 millimol of Titanium tetraisopropylate and different amounts of polyoxyethyleneglycol (ave.mol.wt. 1,500) so as to obtain an initial teaction mixture at 5% molar, 10% molar and 15% molar, respectively, (referred to the 6NT monomer) of polyoxyethyleneglycol. The flask is repeatedly evacuated and filled with nitrogen each time. Then, it is placed on a fluidized bed sand bath which has been preheated to 240° C and, as soon as the mass is melted, stirring is started. The reaction starts immediately with evolution of methanol and is carried out in an inert atmosphere. After 40 minutes transesterification is virtually over and polycondensation begins, which is carried out at a temperature of 270° C and under a residual pressure of about 0.5 Torr. As the polymer mass has attained the desired viscosity, the flask is restored to ambient pressure with an inert gas and is quickly transferred on a water cooling bath. The polymer, upon cooling, appears as a white mass which is crushed in a rotary blade mill. The technological and physico-chemical properties of the several samples are reported in TABLE 1.

TABLE 1

| Ex. | Molar % (PEG) | Polycondensation time minutes | Relative viscosity (1%,25° C) | Melting point ° C (DSC) | Yielding Load MPa | Tensile strength MPa | Elongation at break, % | Compression set (25° C) | Compression set (100° C) |
|---|---|---|---|---|---|---|---|---|---|
| 1 | 5 | 70 | 2.81 | 259 | 30 | 42 | 400 | 31.2 | 5.5 |
| 2 | 10 | 77 | 3.01 | 253 | 28.5 | 38 | 530 | 28 | 49.5 |
| 3 | 15 | 110 | 3.03 | 250 | 21.5 | 29 | 600 | 35.1 | 56.9 |

EXAMPLE 4

With the same procedure as in the previous examples, 100 grams of 6NT are reacted with 56.8 grams of 1,6-hexanediol and 45.4 grams of polyoxyethyleneglycol having an average mol. wt. of 1,000. There is added 0.05 millimol of titanium tetraisopropylate and 187 milligrams of N,N'-bis-(beta-naphthyl)-p-phenylenediamine as a heat-stabilizer.

After 135 minutes of reaction a polymer is obtained having a viscosity (I.V.) of 1.35 and a melting point of 248° C. Its technological properties were:
  Shore Hardness D; 59
  Yielding Load (MPa); 26
  Tensile strength (MPa); 31
  Elongation at break,%; 300
  Compression set (25° C)%; 36
  Compression set (100° C)%; 58

EXAMPLES 5 AND 6

With the same procedure as in Examples 1 to 3, 100 grams of 6NT are reacted with 36 grams of 1,6-hexanediol and variable amounts of polytetramethyleneetherglycol having an ave.mol.wt. of 2,000. There is added 0.05 millimols of titanium (Oisopropyl)$_4$ as a catalyst, together with 184 milligrams of 4,4'-bis(alpha, alpha-dimethylbenzyl)-diphenylamine as a heat-stabilizer for the polymer.

The physico-chemical properties and the technological specifications are reported on TABLE 2, in which also the composition of the polymer is indicated in terms of percentage by weight of macromolecular segments which contain the hard-phasic (FH) low-molecular-weight diol.

TABLE 2

| Ex. | Polycondensation time, minutes | Intrinsic viscosity, V.I. | Melting point, ° C (DSC) | % FH | Yielding load (MPa) | Tensile strength (MPa) | Elongation at break % |
|---|---|---|---|---|---|---|---|
| 5 | 58 | 1.19 | 260 | 61.8 | 27.0 | 33 | 400 |
| 6 | 95 | 1.48 | 255 | 38.5 | 15.0 | 45 | 700 |

EXAMPLES 7 - 10

With the apparatus described in the previous examples and with the same procedures, copolyesteramides are prepared, having different compositions, by reacting 6NT, 1,6-hexanediol (molar ratio of 6NT to 1,6-hexadeniol 1:2.1) with variable amounts of polyoxytetramethyleneglycol having an average molecular weight of 1,000.

As a catalyst, there has been used Ti(O-isopropyl)$_4$ in an amount of 0.022 molar percent relative to 6NT and, as a thermal stabilizer, 4,4'-bis(alpha,alpha-dimethylbenzyl)diphenylamine has been used in an amount equal to 0.14% relative to the final polymer. TABLE 3 reports the technological and physico-chemical properties of the samples.

TABLE 3

| Ex. No. | Polycond-ensation time, minutes | Intrinsic Viscosity (I.V.) | Melting Point, °C (DSC) | FH % (found) | Shore Hardness (D) | Yielding load (MPa) | Tensile strength (MPa) | Elongation at break, % | Tension set at 25% elongation | Tension set at 100% elongation | Compression set at 25° C, % | Compression set at 100° C, % | ΔV, % in oil at 100° C after 7 days | ΔV, % in Fuel B after 70 hours at room temperature | ΔV, % in Fuel C after 70 hours at room temperature | Torsional modulus At 25° C (MPa) | Izod Impact test at 25° C | Izod Impact test at −40° C |
|---|---|---|---|---|---|---|---|---|---|---|---|---|---|---|---|---|---|---|
| 7 | 63 | 1.30 | 256 | 77 | 76 | 47.8 | 38.4 | 53 | 12.5 | — | 46 | 55 | 3 | 4 | 4 | 578 | — | — |
| 8 | 75 | 1.48 | 251 | 64.7 | 70 | 31.6 | 34 | 750 | 7 | 71 | 34 | 50 | 6 | 10 | 12 | 195 | — | — |
| 9 | 81 | 1.55 | 246 | 51.2 | 65 | 23.5 | 38.8 | 530 | 5 | 57 | 35 | 50 | 8 | 12 | 14 | 87 | NB | NB |
| 10 | 85 | 1.70 | 238 | 35.8 | 56 | 18 | 45.4 | 660 | 4 | 46 | 35 | 50 | 12 | 17 | 19 | 63 | NB | NB |

Note: NB = No Break

EXAMPLE 11

The technological evaluation of the copolyesteramide samples has been carried out on compression molded samples which were cooled while still in the press with running water.

As is known, the properties of the semicrystalline materials are a function of the amount of crystalline phase. The crystallinity level of a sample is a function of the cooling rate and of the crystallization rate at various temperatures.

In order to show the high crystallization rate of the copolymers which are the subject-matter of the present invention, said high rate being responsible for the possibility of applying the standard molding procedures thereto, crystallinities have been measured on the as-molded samples and after annealing at temperatures which were 40° C below the melting point (Temperature of maximum crystallization rate) for times comprised between 10 and 30 minutes. The crystallinity percentages have been evaluated by differential calorimetric measurements. TABLE 4 reports the results.

TABLE 4

| Ex. | I.Visc. | % FH | Melting point, °C | Crystallinity, % | % of crystallized hard segment |
|---|---|---|---|---|---|
| 7 | 1.30 | 77 | 256 | 40 | 50 |
| 8 | 1.48 | 64.7 | 251 | 37 | 55 |
| 9 | 1.55 | 51.2 | 246 | 33 | 59 |
| 10 | 1.70 | 35.8 | 238 | 24 | 59 |

The crystallinity percentage has not been substantially affected by the type of annealing: as can be seen in TABLE 4, it is possible, with these copolymers and with simple procedures, without any particular procedures of cooling or annealing, to obtain a high percentages of crystallized hard phase.

EXAMPLE 12

As is known, for the elastoplastic materials, two keystone elements of their performances are the uniformity of the modulus at various temperatures and the breadth of the temperature interval within which the modulus itself retains values which are of interest for practical applications.

On copolyesteramides of different compositions there have been evaluated the moduli, E, at various temperatures, which have been compared with those of a copolyester (thus without hydrogen bonds) having an analogous composition as to hard and soft segments.

The modulus values tabulated in TABLE 5 have been measured with the Rheovibron dynamic viscoelastomer on annular samples by adopting appropriately modified clamps and without making any correction for the sample length.

TABLE 5

| Sample | % FH | E(25° C) MPa·$10^2$ | E(100° C) MPa·$10^2$ | E(150° C) MPa·$10^2$ | E(200° C) MPa·$10^2$ |
|---|---|---|---|---|---|
| 1 | 77 | 8 | 3.6 | 2.5 | 1.8 |
| Control A | 80.5 | 5 | 1.4 | 0.85 | not determinable |
| 2 | 51.2 | 3.6 | 2.2 | 1.6 | 1.0 |
| Control B | 61.4 | 7.5 | 2.6 | 1.6 | 0.7 |

The data show that the variation of the modulus as a function of the temperature is narrower for the copolymers which contain amide groups, which have the possibility of forming hydrogen bonds.

EXAMPLE 13 (A-B-C)

A 500 ml, three-necked flask equipped with stirrer, inert gas intake tube and extention for the distillation of methanol and hexanediol is charged with 100 grams of 6NT monomer, 56.8 grams of hexanediol, 0.05 millimol of titanium tetraisopropylate, 45.4 grams of polyoxyethyleneglycol (PEG) having an average mol. wt. of 1,000, equivalent to 20% molar relative to the 6NT, and 1,135 milligrams of Vangard 445.

The flask is repeatedly evacuated and filled with nitrogen each time. Then the flask is placed on a sand bath of the fluidized bed type which had been preheated to a temperature of 240° C and, as soon as the mass is melted, stirring was started. The reaction starts immediately with evolution of methanol and is carried out at ambient pressure in an inert gas atmosphere.

After 40 minutes, transesterification is virtually completed and polycondensation is started, which is carried out at the temperature of 270° C and under a residual pressure of about 0.5 Torr. As soon as the polymeric mass has attained the expected viscosity, the flask is brought to ambient pressure with an inert gas and is quickly transferred to a cooling water bath. The polymer, upon cooling, is a white mass which is crushed in a rotary blade mill. By operating with the same procedure and varying the quantities of the reactants, a series of copolymers have been prepared, having different compositions, the technological and physico-chemical characteristics of which are reported in TABLE 6.

TABLE 6

| Ex. | Molar % (PEG) | Poly-cond.-time, mins | [η] 25° C dl/g | Melt. pt. °C | Hard segm. % by wt. | Yield load | Tensile strength MPa | Elongation at break % |
|---|---|---|---|---|---|---|---|---|
| A | 20 | 210 | 1.36 | 242 | 58.9 | 24.4 | 42.6 | 445 |
| B | 30 | 295 | 1.25 | 227 | 45.5 | 18.8 | 35.6 | 550 |
| C | 50 | 275 | 1.21 | 207 | 26.4 | 11.0 | 22.9 | 525 |

| Ex. | Hardness D | Tension set at 25% elong. | Tension set at 100% elong. |
|---|---|---|---|
| A | 66 | 10 | 60 |
| B | 59 | 8 | 52 |
| C | 50 | 8 | 44 |

EXAMPLE 14 (D-E-F)

With the same procedure of the previous Examples, different quantities of 6NT, polyhydroxyethyleneglycol having an average molecular weight of 1,500, hexanediol (ED) (average ratio of hexanediol to 6NT = 2.1) have been reacted, and copolymers of various compositions and properties have been obtained, as tabulated in TABLE 7. In all tests, the commercial product Vangard 445 has been used as the antioxidant, in an amount equal to 2.5% by weight relative to the polyhydroxyethyleneglycol introduced in the reaction.

TABLE 7

| Ex. | Molar % PEG | Poly-condens. time | η 25° C dl/g | Melt. pt. °C | Hard segm. % by wt. | Yielding load (MPa) |
|---|---|---|---|---|---|---|
| D | 21.7 | 195 | 1.43 | 243 | 50.4 | 18.7 |
| E | 32.6 | 300 | 1.39 | 219 | 36.7 | 11.3 |
| F | 43.4 | 290 | 1.32 | 210 | 26.9 | 8.3 |

TABLE 7-continued

| Ex. | Tensile strength (MPa) | Elongation at break % |
|---|---|---|
| D | 32.3 | 525 |
| E | 27.4 | 635 |
| F | 23.4 | 735 |

| Ex. | Tensione set at 25% elong. | Tension set at 100% elong. | Shore Hardness D |
|---|---|---|---|
| D | 9 | 51 | 57 |
| E | 8 | 38 | 49 |
| F | 7 | 34 | 44 |

EXAMPLE 15 (G-H-I)

With the same apparatus described above and the same procedures as in the previous examples, there have been prepared copolyesteramides having a low and variable contents of the hard phase, by reacting 6NT, 1,6-hexanediol (molar ratio of 1,6-hexanediol to 6NT = 2.1) with different quantities of polyoxytetramethyleneglycol (PTMEG) having an average molecular weight of 1,000. As the catalyst, Ti(O-isopropyl)$_4$ has been used in an amount equal to 0.022 molar percent relative to 6NT and, as the heat-stabilizer 4,4'-bis-(alpha,alpha dimethylbenzyl) diphenylamine (Vangard 445) was employed in an amount equal to 0.95% by weight relative to PTMEG in tests G and H and in an amount equal to 3.3% by weight relative to PTMEG in test I. TABLE 8 reports the technological and physicochemical properties of the compounds.

TABLE 8

| Ex. | Molar % PTMEG | Poly-cond. time mins. | [η] 25° C dl/g | Melt. pt. °C (DSC) | Hard segm. % by wt. | Shore D Hardness |
|---|---|---|---|---|---|---|
| G | 60 | 120 | 1.79 | 210 | 19.3 | 48 |
| H | 80 | 145 | 1.53 | 189 | 8.3 | 45 |
| I | 90 | 240 | 1.62 | 177 | 3.8 | 44 |

| Ex. | Yielding load (MPa) | Tensile strength (MPa) |
|---|---|---|
| G | 13.0 | 41.0 |
| H | 11.1 | 22.7 |
| I | 11.2 | 25.4 |

| Ex. | Elongation at break % | Tension set at 25% elong. | Tension set at 100% elong. |
|---|---|---|---|
| G | 820 | 6 | 39 |
| H | 690 | 4 | 42 |
| I | 865 | 8 | 46 |

We claim:

1. An elastomer of thermoplastic orderly arranged copolyesteramide composed by segments of macromolecule containing diol having a molecular weight lower than 250 and segments containing polyhydroxyalkyleneglycols of average molecular weight comprised between 400 and 3,500, such segments being united to each other by ester bonds, with the intermediary of a radical deriving from a diesterdiamide containing preformed amide bonds having the general formula:

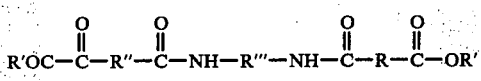

in which R' is an alkyl radical having from 1 to 8 carbon atoms and/or an aryl radical having from 6 to 10 carbon atoms and/or a cycloalkyl radical having from 4 to 10 carbon atoms, and R" and R''' are bivalent hydrocarbon radicals having from 2 to 30 carbon atoms.

2. A thermoplastic elastomer as claimed in claim 1 wherein the polyhydroxyalkylene glycol is tetramethyleneetherglycol having a molecular weight of from 600 to 2,000 and the low-molecular weight glycol is 1,6-hexanediol.

3. A thermoplastic elastomer as claimed in claim 1 wherein the low molecular weight diol is a mixture of 1,6-hexanediol and neopentylglycol.

4. A thermoplastic elastomer as claimed in claim 1 wherein the diesterdiamide constitutes from 2% to 80% of the polymer.

5. A thermoplastic elastomer as claimed in claim 1 wherein the polyhydroxyalkylene glycol is selected from the group consisting of poly-(1,2-propyleneoxy) glycol and poly-(1,3-propyleneoxy) glycol.

6. A thermoplastic elastomer as claimed in claim 1 wherein the diol having a molecular weight lower than 250 is derived from a bivalent hydrocarbon radical having from 2 to 14 carbon atoms.

UNITED STATES PATENT AND TRADEMARK OFFICE
CERTIFICATE OF CORRECTION

PATENT NO. : 4,105,640
DATED : August 8, 1978
INVENTOR(S) : Giorgio Della Fortuna and Luciano Zotteri It is certified that error appears in the above-identified patent and that said Letters Patent are hereby corrected as shown below:

On the cover, "Assignee: ANIC S.p.A., Mendrisio Stazione, Switzerland" should be --Assignee: ANIC S.p.A., Palermo, Italy--.

Signed and Sealed this

Eighth Day of May 1979

[SEAL]

Attest:

RUTH C. MASON
Attesting Officer

DONALD W. BANNER
Commissioner of Patents and Trademarks